United States Patent
Joo

(10) Patent No.: US 6,792,689 B2
(45) Date of Patent: Sep. 21, 2004

(54) REMOTE CENTER COMPLIANCE DEVICE

(76) Inventor: Sang-wan Joo, Suite 108-502, Shindorim Dong-A Apartment, 643-bunji, Shindorim-dong, Guro-gu, Seoul (KR), 305-350

( * ) Notice: Subject to any disclaimer, the term of this patent is extended or adjusted under 35 U.S.C. 154(b) by 0 days.

(21) Appl. No.: 10/338,478

(22) Filed: Jan. 8, 2003

(65) Prior Publication Data

US 2004/0128850 A1 Jul. 8, 2004

(51) Int. Cl.[7] .............................................. G01B 5/25
(52) U.S. Cl. .......................................... 33/644; 33/520
(58) Field of Search ........................ 33/644, 520, 533, 33/645

(56) References Cited

U.S. PATENT DOCUMENTS

| | | | |
|---|---|---|---|
| 4,098,001 A | * | 7/1978 | Watson ........................ 33/644 |
| 4,627,169 A | * | 12/1986 | Zafred et al. ................. 33/644 |
| 4,848,757 A | * | 7/1989 | De Fazio ..................... 33/644 |
| 4,897,930 A | * | 2/1990 | Cusack ........................ 33/644 |
| 5,396,714 A | * | 3/1995 | Sturges et al. ............... 33/644 |
| 5,836,083 A | * | 11/1998 | Sangwan ..................... 33/644 |
| 6,021,579 A | * | 2/2000 | Schimmels et al. ........... 33/645 |
| 6,408,531 B1 | * | 6/2002 | Schimmels ................... 33/644 |
| 6,473,985 B2 | * | 11/2002 | Won et al. .................... 33/644 |

* cited by examiner

*Primary Examiner*—Diego Gutierrez
*Assistant Examiner*—Madeline Gonzalez
(74) *Attorney, Agent, or Firm*—Scully, Scott, Murphy & Presser

(57) ABSTRACT

The present invention discloses a remote center compliance device, comprising: upper and lower structures arranged in parallel to face each other; a plurality of elastic bodies coupling the upper and lower structures around a central axis of the remote center compliance; and three or more polar-type limiters of the same height installed on a first structure of one of the upper and lower structures around the central axis to extend toward a second structure of the other, wherein the limiters are arranged such that at least one limiter exists in each of both sides as to a straight line passing through the central axis on a plane vertical to the central axis, so that when a predetermined elastic displacement of an up-and-down direction occurs in the elastic bodies, the predetermined elastic displacement of the elastic bodies is restricted by supporting a contact surface installed on an end portion of the respective limiters by a bedplate installed on the second structure.

10 Claims, 9 Drawing Sheets

PRIOR ART

PRIOR ART

REMOTE CENTER COMPLIANCE DEVICE

BACKGROUND OF THE INVENTION

1. Field of the Invention

The present invention relates to a remote center compliance (MRCC) device, which can correct automatically a location error or an angle error between parts incurred in an insertion work of machinery parts. More particularly, the present invention relates to a remote center compliance, which can be used in a force-insertion work that is a work for inserting a part and putting it together forcibly.

2. Background of the Related Art

As a device which easily correct a location error or an angle error between central axises of parts put together incurred in an insertion work that is a work for inserting a precise part such as a precise shaft, a pin and a bearing into a part having an inside diameter greater than an outside diameter of the precise part such as a shaft hole, a pin bole and a bearing bore and putting it together in order to smoothly perform the insertion work, U.S. Pat. Nos. 4,379,363 and 4,414,750 disclose a remote center compliance which automatically corrects, using a principle of elastic center, a location error or an angle error between parts.

Here, the principle of elastic center is referred to as a mechanical principle that when an elastic center is located near an object belonging to the remote center compliance device and an external force acting on the object passes through the elastic center, only a translation is performed in a direction of the external force without performing a rotation, and when a moment acts on the elastic center the object performs only a rotation centering on the elastic center without performing a translation.

Such a remote center compliance includes upper and lower structures coupled to each other by a plurality of elastic bodies symmetrically arranged centering on a central axis of the structures. The upper structure is held by an operating end of a robot or dedicated assembly apparatus, and the lower structure moving according to a principle of an elastic center includes a gripper holding a part inserted and put together.

As the elastic body an elastomer shear pad (ESP) including metal washers stacked in turn is often used. When the elastic bodies are appropriately arranged between the upper and lower structures, the elastic center exists on a central axis of the remote center compliance. The remote center compliance has a feature that an elastic repulsive force is relatively strong as to a direction of the central axis and is relatively weak as to a direction of behind and front and right and left and a twisting directing centering on the pivot.

When a precise shaft having a circular cross-section is inserted into a shaft hole to put together using an industrial robot or a dedicated assembly apparatus, a location error or angle error often occurs between the central axises of the parts inserted and put together. It is known that in order to smoothly perform the insertion work while correcting the location error or angle error, the elastic center is located near an end of the part to be inserted and put together.

FIG. 11 is a cross-sectional view illustrating a state that an insertion work is performed using a conventional remote center compliance device. The remote center compliance 1 is held by an operating end of a robot or dedicated assembly apparatus through a bracket 10, and a precise shaft 6a is inserted into a shaft hole 7a to put together. The remote center compliance 1 includes an upper structure 2 held by the bracket 10 and a lower structure 3 having a gripper 8 holding the precise shaft 6a. Even though a plan view of the remote center compliance 1 is omitted, three elastic bodies 4 are arranged with a phase 120° on a concentric circle centering on a central axis C of the remote center compliance 1 and are inclined somewhat to the central axis C to couple the upper and lower structures 2 and 3.

The remote center compliance 1 is designed such that an elastic center P thereof is located around an end portion of the precise shaft 6a held by the gripper 8 according an arrangement of the respective elastic bodies 4. When a location error e occurs between the precise shaft 6a and the shaft hole 7a, when the precise shaft 6a is moved in a straight line of a direction V, an end portion of the precise shaft 6a contacts an angled portion f of the shaft hole 7a to cause a repulsive force R.

At this point, the contact force R is defined by a horizontal component force Rx and a vertical component force Rz. The horizontal component force Rx passes through the elastic center P and so performs only a translation in horizontal direction without causing a rotation. On the other hands, the vertical component force Rz acts as a moment centering on the elastic center P. But, since a repulsive force of the central axis C is very strong in the elastic center P of the remote center compliance 1, few rotations occurs in the lower structure 3.

Therefore, as shown in FIG. 12, the precise shaft 6a performs a translation along the angled portion f of the shaft hole 7a and then is inserted into the shaft hole 7a. In the insertion work of the precise part, an angle error incurred at an initial stage is a fatal ground of an inferior assembly, and thus it is very important to align the elastic center P with an end portion of the part to be inserted and put together.

As described above, when a precise part such as a precise shaft, a pin, and a bearing having a circular shaped cross section is inserted by an industrial robot or a dedicated assembly apparatus using the remote center compliance device, an excessive insertion force which may occur due to a location error and an angle error between assembly parts can be prevented in advance. As a result, since a bad influence on the robot or the assembly apparatus and part damages can be suppressed, product quality and work efficiency can be improved, and a high-precision assembly line can be co constructed at a low cost.

However, the conventional remote compliance performs a relatively loose insertion work smoothly by automatically correcting a location error or an angle error between the central axises of the parts to be inserted and put together. On the other hands, in a tight insertion work, i.e., force-insertion work in which an outside diameter of the part (e.g., precise shaft) to be inserted is greater than an inside diameter of the part (e.g., shaft hole), an insertion force of hundreds to thousands of kgf is required. Such a strong insertion force may destroy the elastic bodies. Therefore, the conventional remote center compliance cannot be used in a force-insertion work. In other words, even though the conventional remote center compliance corrects a location error between the central axises of the parts to be put together, when any of the elastic bodies becomes bent due to a strong insertion force, the part held by the lower structure is inclined so that the force-insertion work cannot be performed properly.

SUMMARY OF THE INVENTION

To overcome the problems described above, preferred embodiments of the present invention provide a remote center compliance device, which can be used in a force-insertion work as well as an insertion work.

In order to achieve the above object, the preferred embodiments of the present invention provide a remote center compliance device, comprising: upper and lower structures arranged in parallel to face each other; a plurality of elastic bodies coupling the upper and lower structures around a central axis of the remote center compliance; and three or more polar-type limiters of the same height installed on a first structure of one of the upper and lower structures around the central axis to extend toward a second structure of the other, wherein the limiters are arranged such that at least one limiter exists in each of both sides as to a straight line passing through the central axis on a plane vertical to the central axis, wherein each of the limiters includes a head portion having a wide section area on the end portion thereof and screw portions on the lower portion thereof, a gap t is given between a flat contact portion on an upper surface of the limiter and an upper surface of the upper structure, a gap u is given between an outer circumference of the head portion and an inside surface of a hole (2b) and the gap t is set to be smaller in shear transformation limit than an elastic displacement $\delta_c$ of an axis direction and be identical to a predetermined elastic displacement $\delta_s$, so that when a predetermined elastic displacement of an up-and-down direction occurs in the elastic bodies, the predetermined elastic displacement of the elastic bodies is restricted by supporting a contact surface installed on an end portion of the respective limiters by a bedplate installed on the second structure, wherein the limiters are arranged such that at least one limiter exists in each of both sides as to a straight line passing through the central axis on a plane vertical to the central axis, so that when a predetermined elastic displacement of an up-and-down direction occurs in the elastic bodies, the predetermined elastic displacement of the elastic bodies is restricted by supporting a contact surface installed on an end portion of the respective limiters by a bedplate installed on the second structure.

A hole receiving the end portion of the limiter is installed in a portion of the second structure corresponding to a portion of the first structure where the limiter is installed, and the bedplate supporting the contact surface is installed in a member fixed to a opposite surface of the hole into which the end portion of the limiter is inserted.

The present invention further provides a remote center compliance, comprising: upper and lower structures arranged in parallel to face each other; a plurality of elastic bodies coupling the upper and lower structures around a central axis of the remote center compliance; and a limiting cover installed on a first structure of the other, wherein a gap t is given between a contact portion on an upper surface of the limiting cover and a bed plate, a gap u is given between an outer circumference of the lower structure and an inner circumference of a lower end portion in which a diameter of the limiting cover becomes large and the gap t is set to be smaller in shear transformation limit than an elastic displacement δc of an axis direction and be identical to a predetermined elastic displacement δs, so that when a predetermined elastic displacement of an up-and-down direction occurs in the elastic bodies, the predetermined elastic displacement of the elastic bodies is restricted by supporting a contact surface installed on an end portion of the limiting cover by a bedplate installed on an outer circumference portion of the second structure.

The upper structure is the first structure. The elastic body includes rubber plates and metal washers which are stacked in turn, and a predetermined elastic displacement is set to be smaller in shear transformation limit of the elastic body than an elastic displacement of an axis direction.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to preferred embodiments of the present invention, example of which is illustrated in the accompanying drawings.

FIGS. 1 through 8 shows a remote center compliance according to a first embodiment of the present invention.

Figure 1:
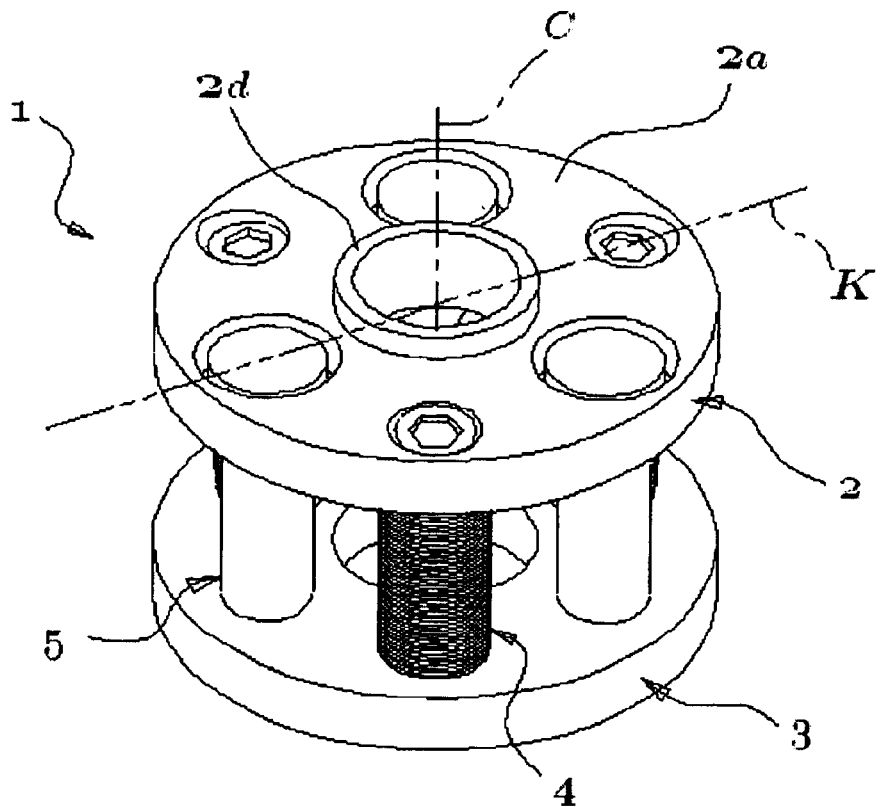
FIG. 1 is a perspective view illustrating a remote center compliance according to a first embodiment of the present.
Figure 2:
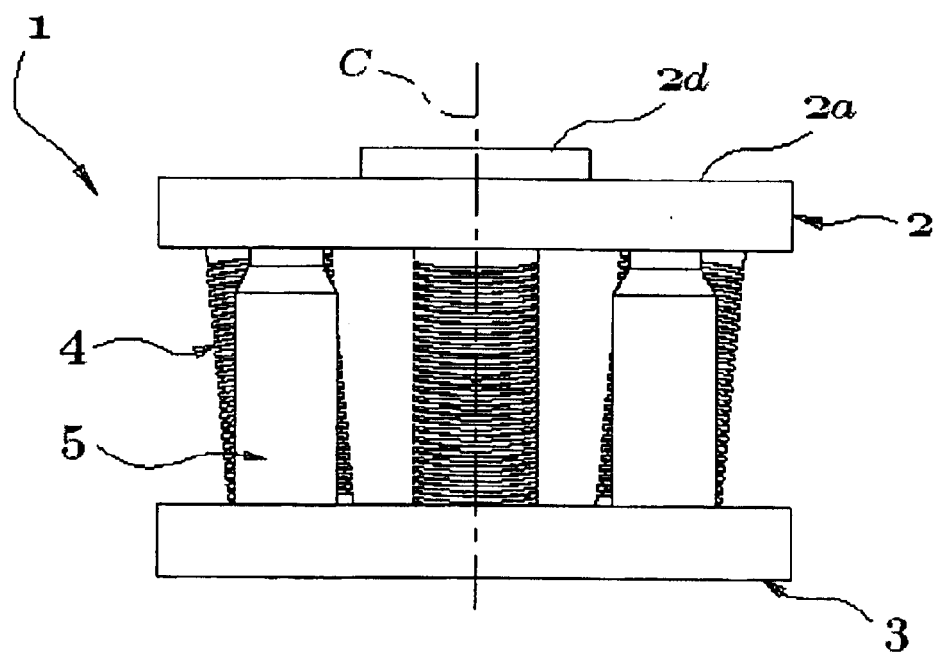
FIG. 2 is a front view illustrating the remote center compliance of FIG. 1.

The remote center compliance 1, as shown in FIGS. 1 and 2, includes upper and lower structures 2 and 3, three elastic bodies 4 of the same length coupling the upper and lower structures 2 and 3 in parallel, and three limiters 5 of the same height installed on an upper surface of the lower structure 3.

The respective elastic bodies 4 are arranged on a concentric circle centering on a central axis C at a phase interval of 120°. The elastic bodies 4 couples the upper and lower structures 2 and 3 in such a way that lower portions of the elastic bodies 4 are inclined somewhat. The limiters 5 are installed on another concentric circle centering on the central axis C at a phase interval of 120°. Here, the limiters 5 differs from the elastic bodies 4 in phase arrangement. An end portion of the limiter 5 is inserted into a hole 2b of the upper structure 2 prepared at a location corresponding to an installation location thereof Hence, as to a straight line k passing through the central axis C, at least one limiter 5 exists on a surface vertical to the central axis C in each of both sides thereof.

Figure 3:
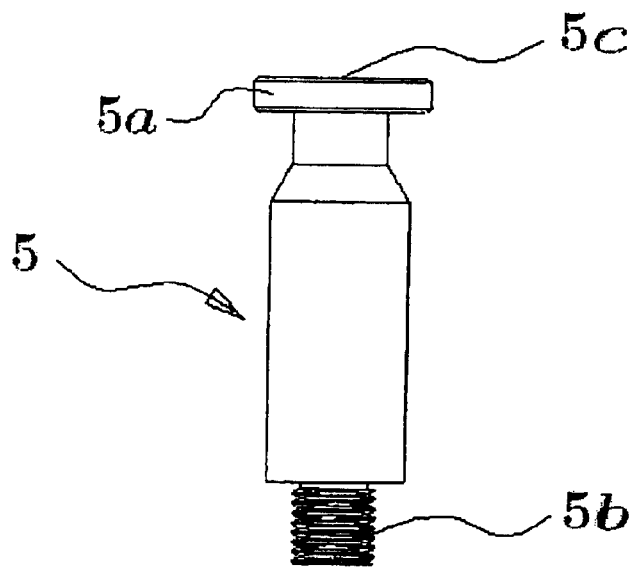
FIG. 3 is a front view illustrating a limiter of FIG. 1.

The limiter 5 is made of a material having a sufficient strength such as steel or aluminum and includes a head portion 5a having a wide section area on the end portion thereof and a screw portion 6b to be screw-coupled to the lower structure 3 as shown in FIG. 3.

Figure 4:
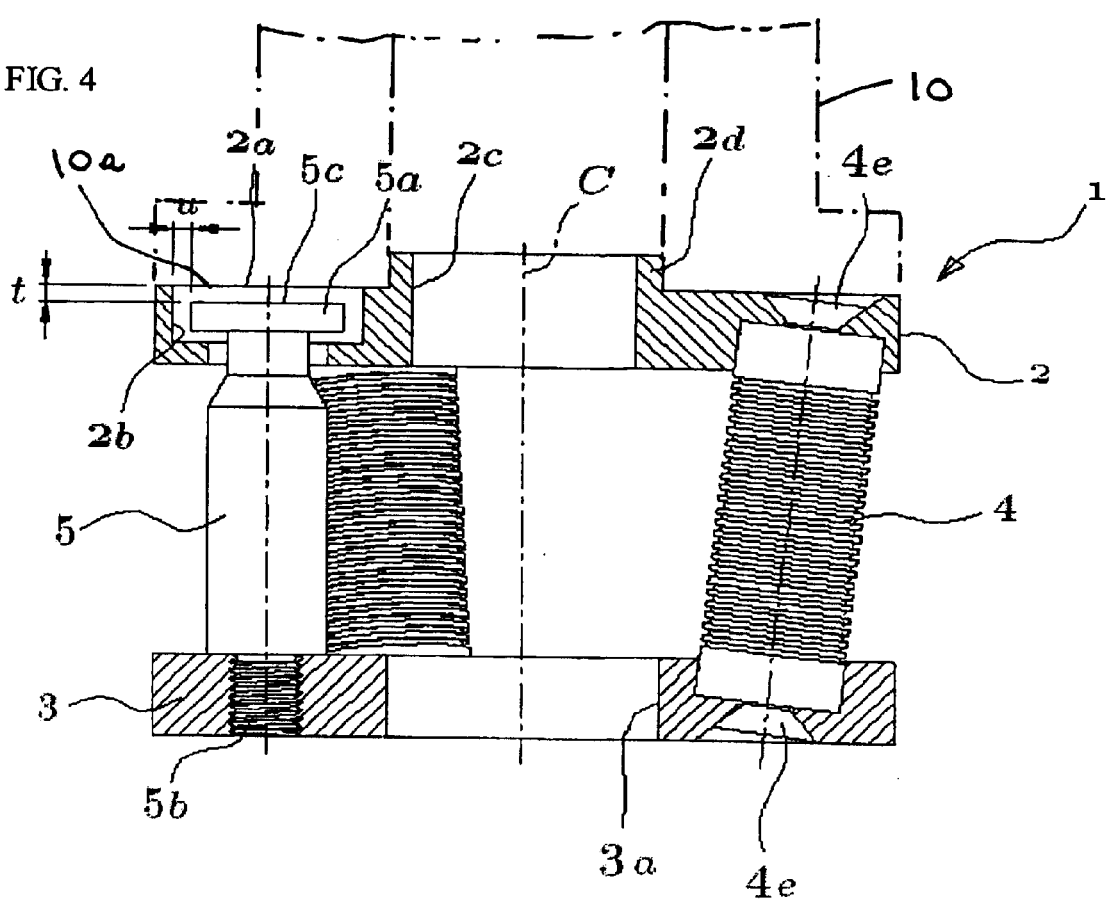
FIG. 4 is a cross-sectional view illustrating the remote center compliance of FIG. 2.
Figure 6:
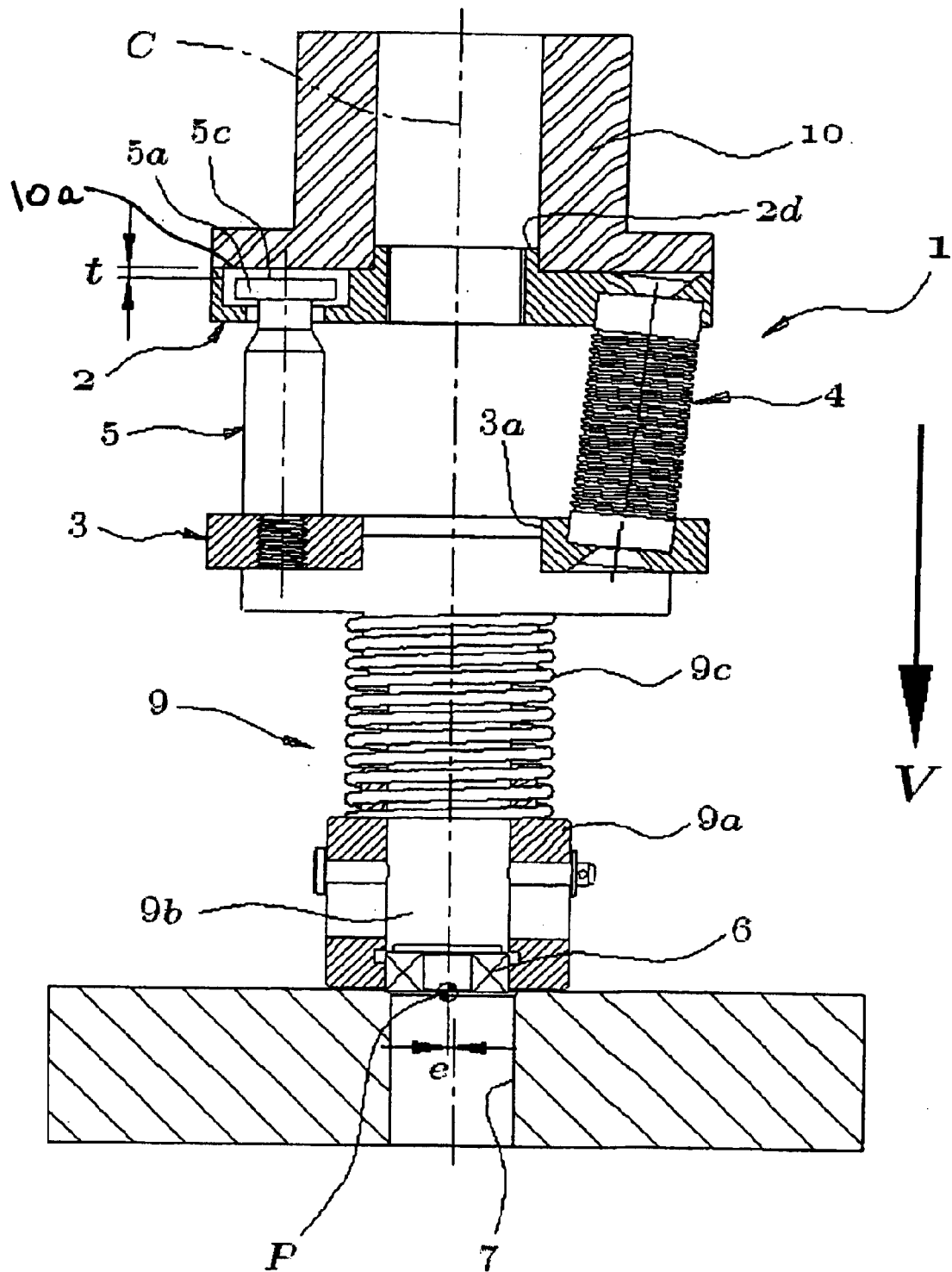
FIGS. 6 and 7 are cross-sectional views illustrating a state that a force-insertion work is performed using the remote center compliance of FIG. 1.

As shown in FIG. 4, the head portion 5a of the limiter 5 has a flat contact portion 5c on an upper surface thereof. A gap t is given between the contacting portion 5c and an upper surface 2a of the upper structure 2, and a gap u is given between an outer circumference of the head portion 5a and an inside surface of the hole 2b. A central hole 2c is prepared in the upper structure 2, and a circular boss 2d to be inserted into bracket 10, which is shown in FIG. 6, is formed along an outer circumference of the central hole 2c. Portions of the bracket 10 corresponding to the holes 2b of FIG. 4 act as a bedplate 10a, shown as plane S in FIG. 8, supporting the contact portion 5c of the limiters 5. Therefore, a central hole 3b in which a bearing holder is held is formed in the lower structure 3.

As shown in FIG. 5a, the elastic body 4 is an ESP in which rubber plates 4a and metal washers 4b are stacked in an axis direction in turn, and a bolt hole 4d is installed in a central point of respective fixing portions 4c. The ESP has a relatively strong elastic force to a compression of an axis direction and a tension variation but has a relatively weak elastic force to a shear transformation of a direction vertical to an axis direction and a twist transformation around an axis direction. As shown in FIG. 4, the elastic body 4 couples the upper and lower structures 2 and 3 by using a counter-sink bolt 4e as a coupling bolt.

Figure 5:
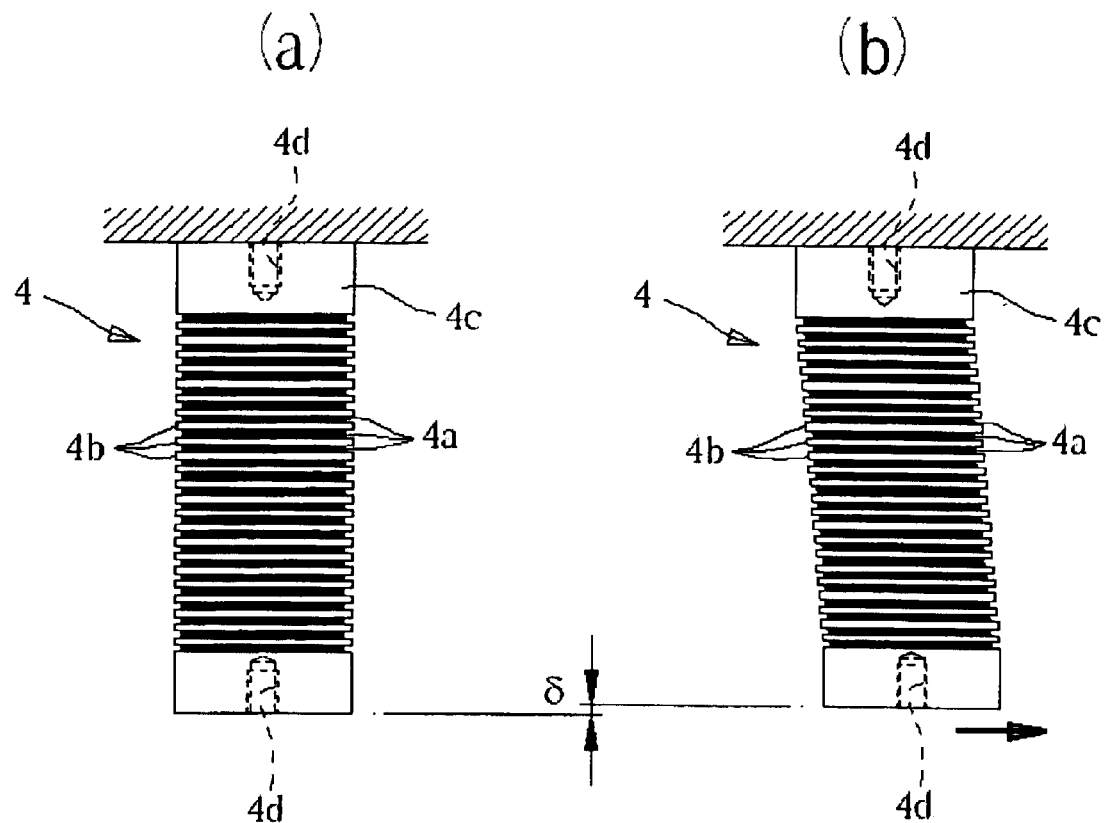
FIG. 5a is a front view illustrating an elastic body of FIG. 1.
FIG. 5b is a front view illustrating a state that the elastic body of FIG. 5a is sheared.

As shown in FIG. 5, when the lower fixing portion 4c is translated in a horizontal direction in a state that the upper fixing portion 4c is fixed, even though a compression force is not applied to the elastic body 4, the rubber plate 4a surrounded by the metal washer 4b is sheared, so that an elastic displacement δ of a vertical direction is generated in the elastic body 4. The gap t between the contact surface 5c and the bedplate is set to be smaller in shear transformation limit than an elastic displacement $\delta_c$ of an axis and be identical to a predetermined elastic displacement $\delta_s$.

Figure 7:
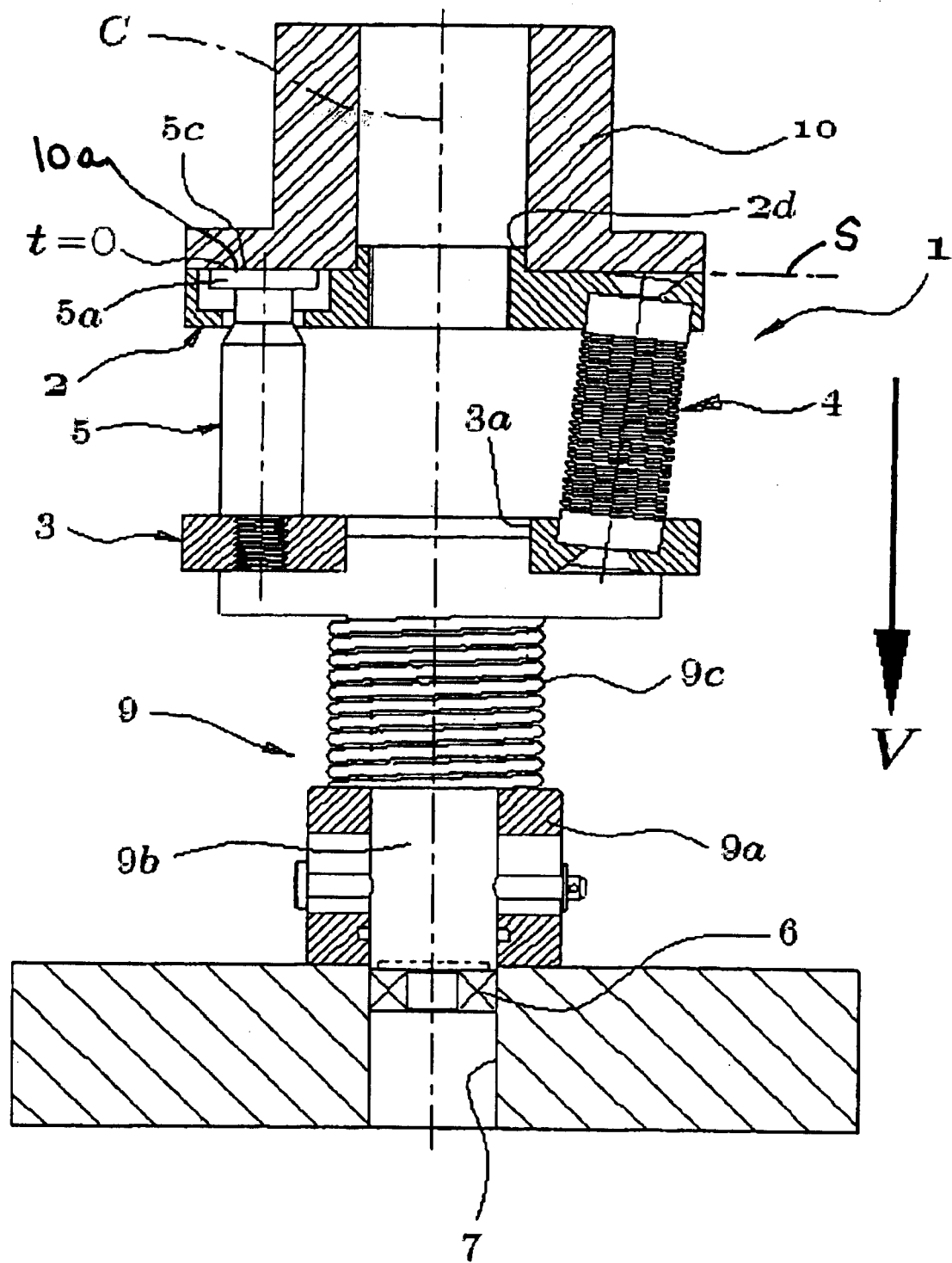

FIGS. 6 and 7 show a state that a bearing 6 is inserted forcibly into the bearing bore 7 to put together by the remote center compliance 1 held by a robot or dedicated assembly apparatus through the bracket 10. The upper structure 2 of the remote center compliance 1 is attached to the bracket 10, and the bearing holder 9 holding an outer wheel of the bearing 6 is attached to a bottom of the lower structure 3.

In the bearing holder 9, an inside cylindrical member 9b is inserted into an outside cylindrical member 9a in a sliding method. A coil spring 9c is fit between a flange portion of the inside cylindrical member 9b arranged on a bottom of the lower structure 3 and an outer circumference step portion of the outer hollow cylindrical member 9a. The bearing 6 arranged in an inner circumference of the outer hollow cylindrical member 9a is pushed to an end of the inner cylindrical member 9b to be force-inserted. When a force-insertion is finished, the bearing holder 9 returns to an original state by an elastic restoring force of the coil spring 9c together with a rise of the lower structure 3.

As shown in FIG. 6, the elastic center P of the remote center compliance 1 is located near a lower end of the bearing 6 attached to the bearing holder 9. When a location error e occurs between the central axises of the bearing 6 and the bearing bore 7, the bearing 6 becomes protruded somewhat from a lower end of the hearing bore 7, so that when it contact an angled portion of the bearing bore 7, the lower structure 4 is translated in a horizontal direction by a principle of the elastic center, whereupon a location error e between the central axises is corrected automatically.

As described above, after the location error e is corrected, when the remote center compliance 1 is moved down in a direction V to force-insert the bearing 6, as shown in FIG. 7, a lower end of the outer hollow cylindrical member 9a of the bearing holder 9 touches an upper end of the bearing bore 7 to stop its movement, and the inner cylindrical member 9b compresses the coil spring 9c to force-insert the bearing into the bearing bore 7.

The force-insertion force incurred at this time is transferred to the lower structure 3 of the remote center compliance 1. Here, since the gap t is set to be smaller in shear transformation limit than an elastic displacement $\delta_c$ of an axis direction and be identical to a predetermined elastic displacement $\delta_s$, before a strong compression force is applied to the elastic body 4, the gap t becomes "0", and thereafter the force-insertion force is born by the limiters 5. Therefore, since an excessive compression displacement of the respective elastic bodies 4 is restricted, a buckling can be prevented.

As described above, since three limiters 5 are arranged in such a way that as to a straight line k passing through the central axis C, at least one limiter 5 exists on a surface vertical to the central axis C in each of both sides thereof, the gap t becomes "0", so that even though a strong force-insertion force is applied, a parallelism of the lower structure 3 is maintained, whereupon the force-insertion work can be performed accurately.

Figure 8:
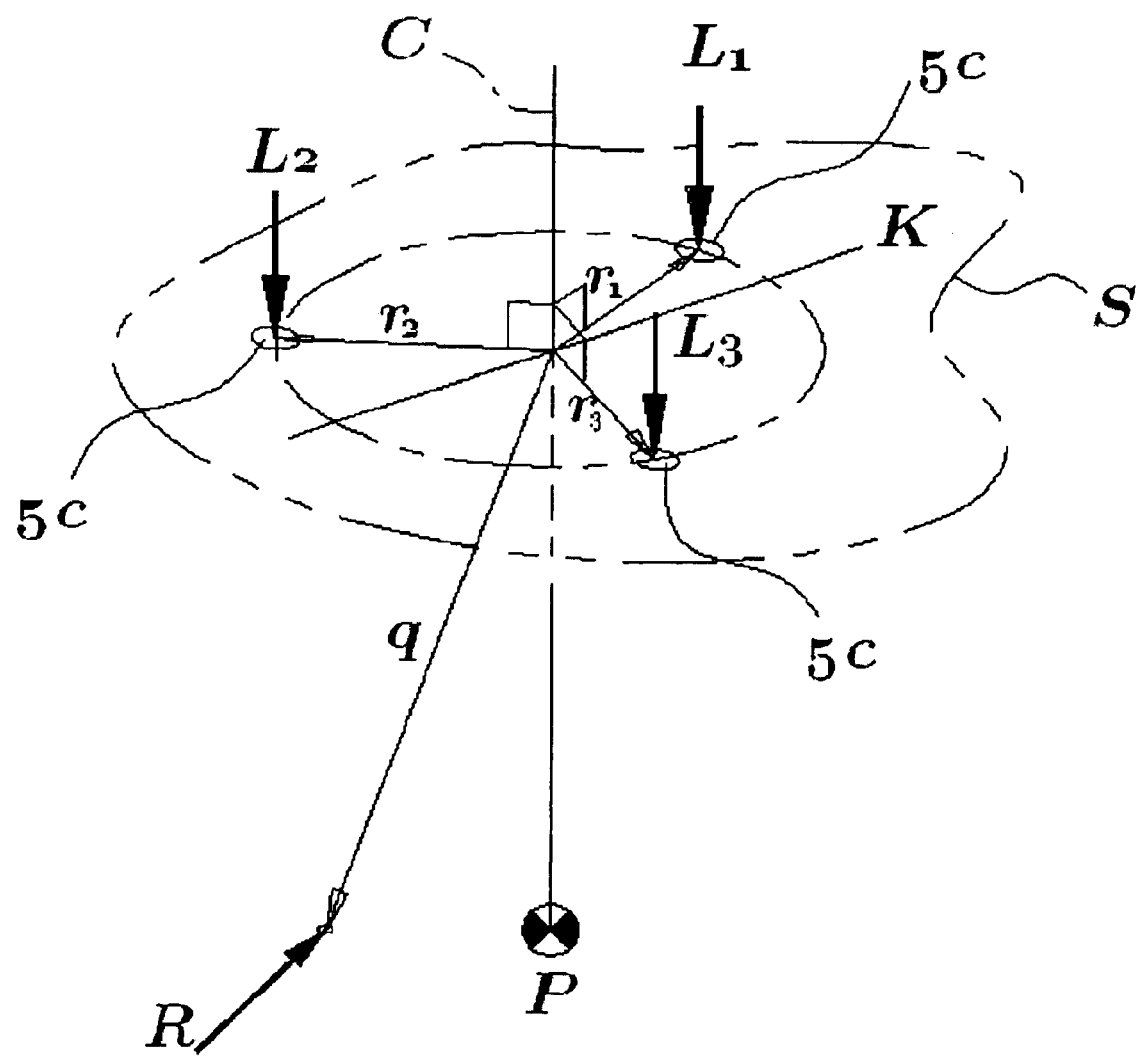
FIG. 8 is a mimetic diagram to describe a force-insertion repulsive force and an equilibrium state of a moment of a force-insertion force in a typical force-insertion situation.

In other words, as shown in FIG. 8, if in a general force-insertion situation a relationship between a force-insertion repulsive force R and a force-insertion force Li (i=1, 2,~N) applied from a bedplate surface to an N-number of limiters 5 does not meet the following static equilibrium equality, the lower structure 3 rotates centering on the straight line k passing through the central axis C on a plane, so that a forcibly inserted part may be force-inserted obliquely.

$$R \times q - \sum_{i=1}^{n} L_i \times r_i = 0 \quad (1)$$

where q and r denote a moment arm with respect to R and Li, respectively, from the central axis C in a plane S having a bedplate surface of the respective limiters 5.

In order to satisfy this equilibrium equality, it is required that N is three or more and at least one limiters exist in each of both sides as to the straight line k passing through the central axis C on the plane vertical to the central axis C of the remote center compliance. Meanwhile, the limiters 5 is preferably arranged at a location far from the central axis C. Also, by increasing the number of the limiters 5 and a cross-section area of the limiters 5, it is possible to increase a permissible force-insertion force and to cope with the force-insertion work requiring a large force-insertion force by the relatively small remote center compliance 1.

Figure 9:
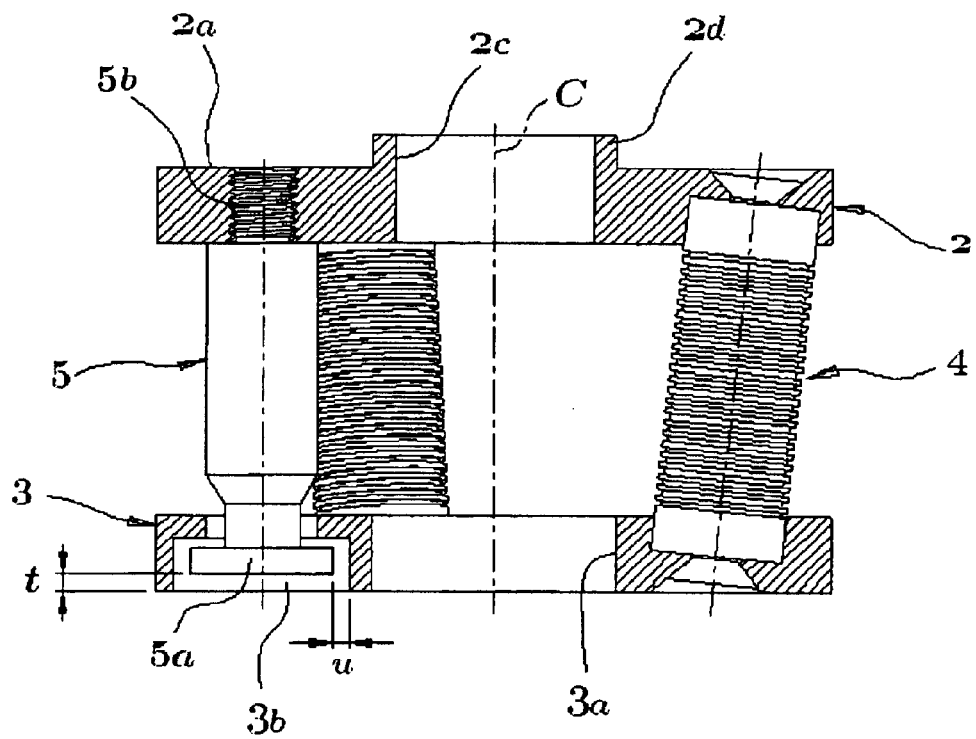
FIG. 9 is a cross-sectional view illustrating a remote center compliance according to a second embodiment of the present invention.

FIG. 9 shows a remote center compliance according to a second embodiment of the present invention. The remote center compliance 1 includes upper and lower structures 2 and 3. Three limiters 5 of the same height are installed downwardly on a bottom of the upper structure 2, and the ends of the limiters 5 are inserted and received by the holes 3b in the lower structure 3. The respective limiters 5, like those of the first embodiment of the present invention, are arranged at a phase interval of 120° in a concentric circle form around the central axis C of the remote center compliance 1.

A flat contact surface 5c is installed on an end of a head portion 5a facing a downward direction of the respective limiters 5 and has a gap t from an upper surface of a bearing holder 9 attached to the lower structure 3. Also, a gap u is given between an outer circumference of the head portion 5a and an inner surface of the hole 3b. The rest portions are identical to the first embodiment of the present invention, and the gap t is set to be smaller in shear transformation limit than an elastic displacement $\delta_c$ of an axis direction and be identical to a predetermined elastic displacement $\delta_s$.

Figure 10:
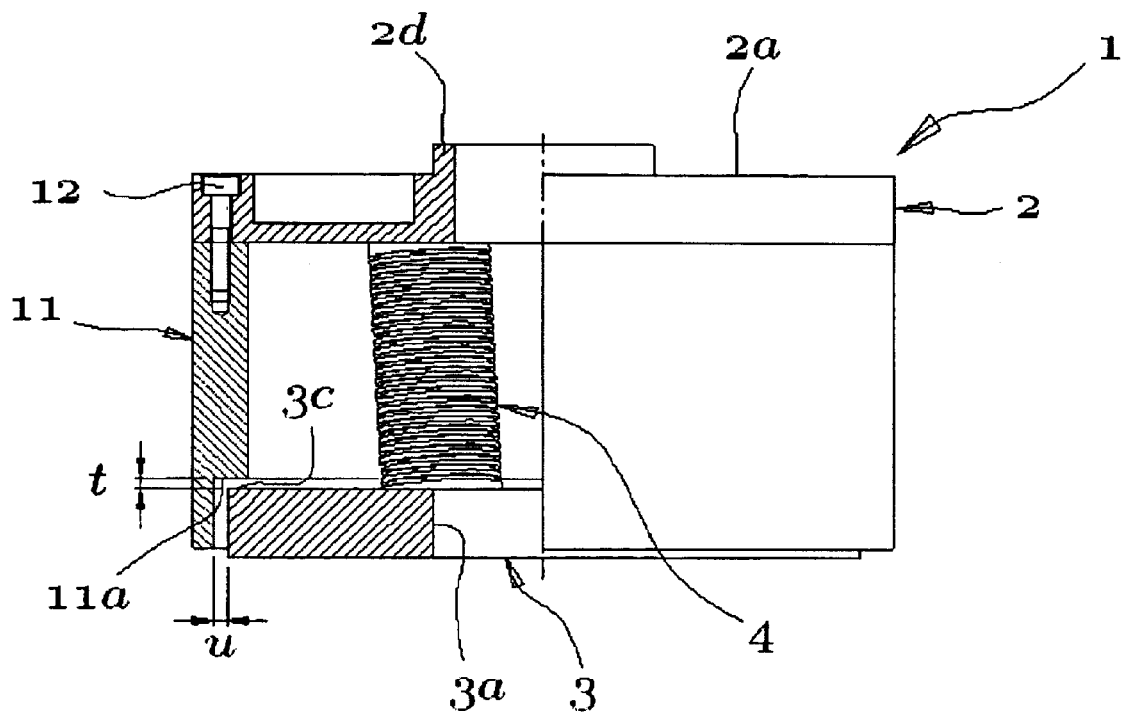
FIG. 10 is a cross-sectional view illustrating a remote center compliance according to a third embodiment of the present invention.
Figure 11:
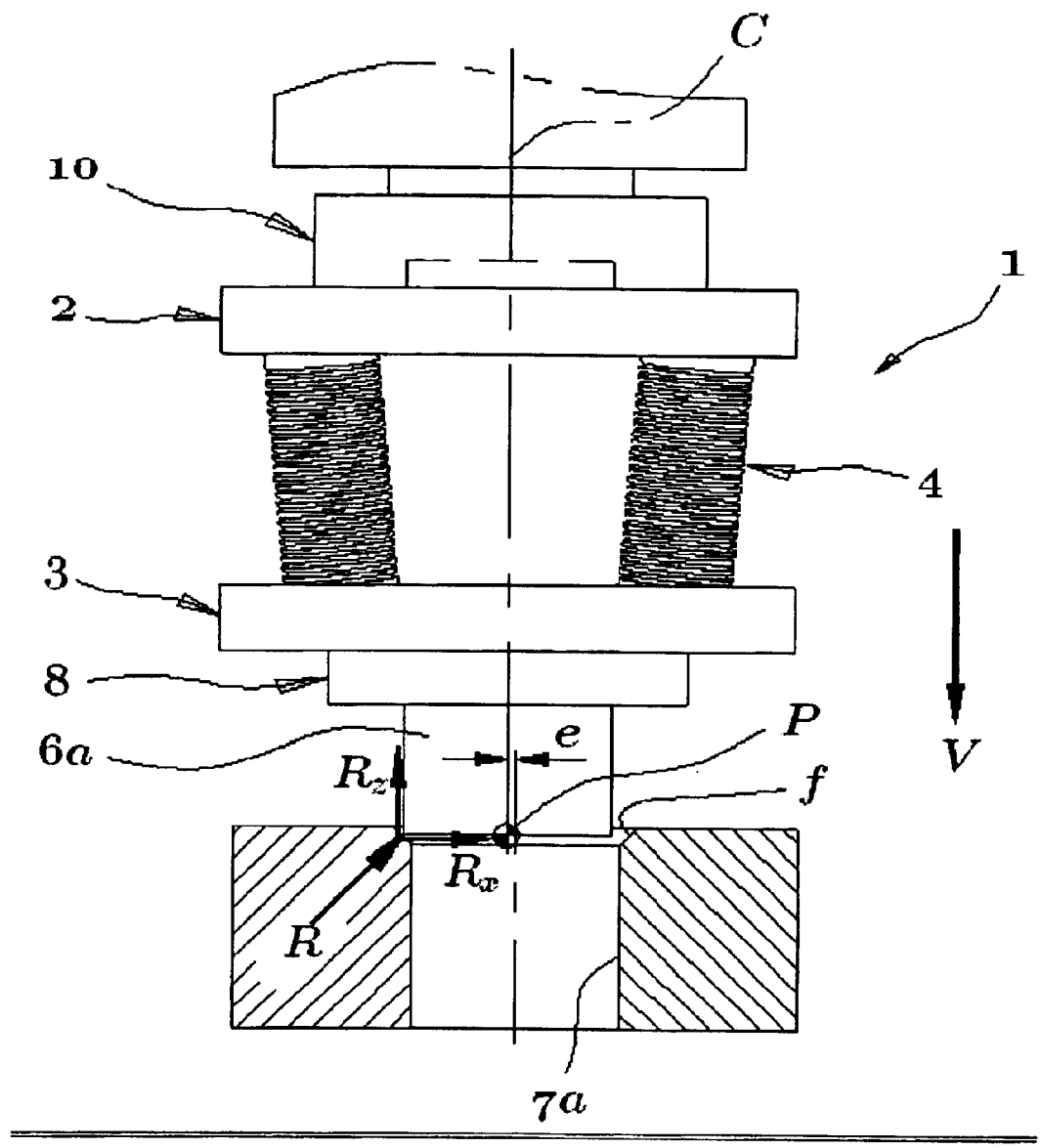
FIGS. 11 and 12 are cross-sectional views illustrating a state that an insertion work is performed using a conventional remote center compliance.
Figure 12:
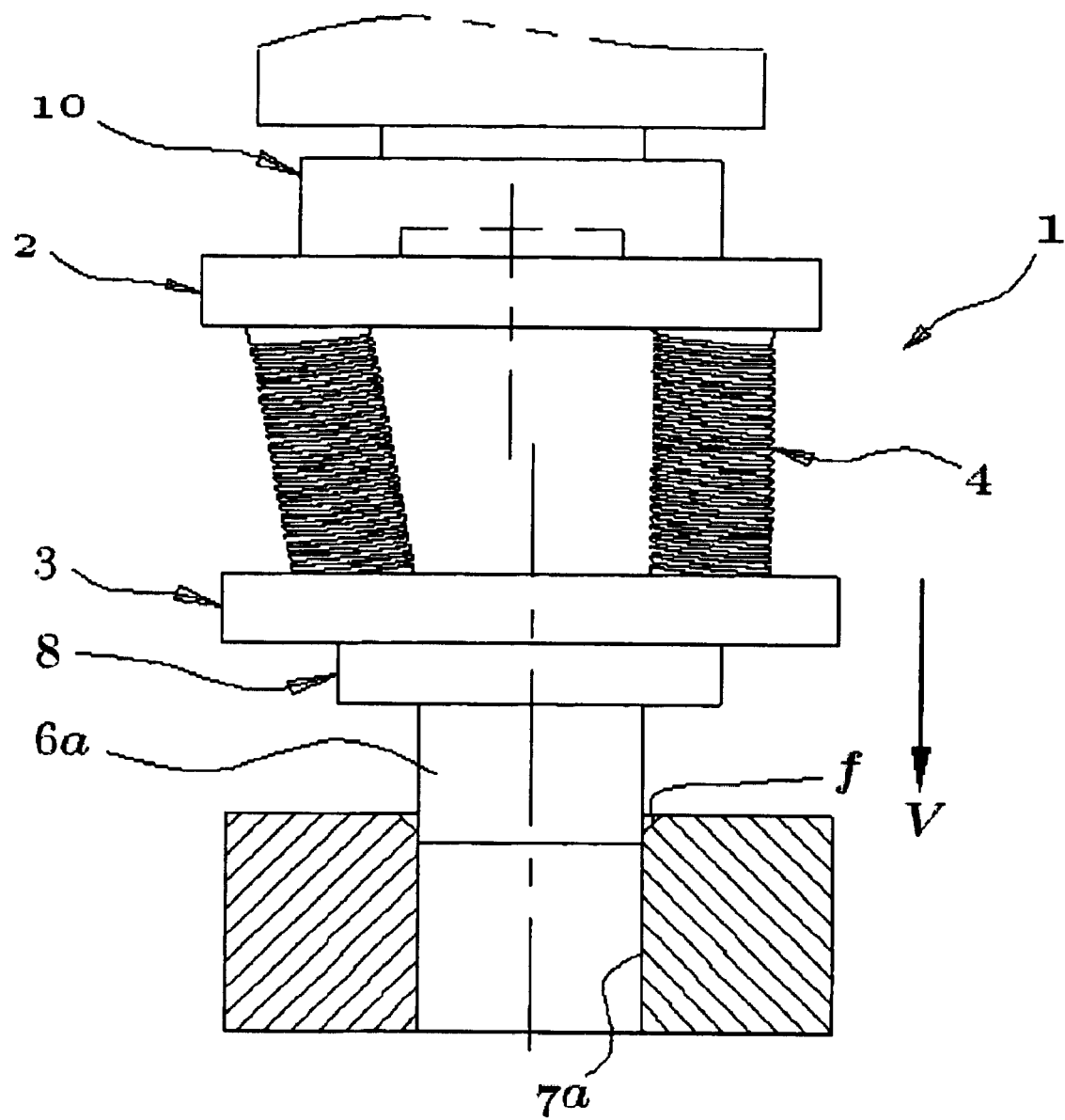

FIG. 10 shows a remote center compliance according to a third embodiment of the present invention. Like that of the second embodiment, the remote center compliance 1 includes upper and lower structures 2 and 3. Instead of the limiters 5 of the second embodiment, a cylindrical limiting cover 11 is coupled to a bottom of an outer circumference portion of the upper structure 2 by a bolt 12. A contact surface 11a is installed on a lower end of the limiting cover 11, and an upper outer circumference portion of the lower structure 3 acts as a bedplate 3c. A gap t is given between the contact surface 11a and the bedplate 3c, and a gap u is given between an outer circumference of the lower structure 3 and an inner circumference of a lower end portion in which a diameter of the limiting cover 11 becomes large. Elastic bodies 4 are arranged in the same way as the first and second embodiments, and the gap t is set to be smaller in shear transformation limit than an elastic displacement bc of an axis direction and be identical to a predetermined elastic displacement $\delta_s$.

Since the limiting cover 11 is formed integrally, the contact surface 11 a can be formed precisely by a typical turnery, and the remote center compliance 1 can be assembled simpler than in the first and second embodiments. In addition, since the limiting cover 11 protects the elastic bodies 4 from an external heat or oil, there is an advantage in that a durability and a life span of the remote center compliance are increased.

Since in the remote center compliance 1 of the second and third embodiments the limiter 5 or the limiting cover 11 is attached to the upper structure 2 and thus parts attached to the lower structure 3 is small in number, a movement by an elastic transformation of the elastic bodies 4 can be lightened by reducing an inertial mass while a life span thereof can be increased by reducing a load of the elastic bodies 4.

In the embodiments of the present invention, the contact surface of the limiter or the limiting cover has the bedplate of a plane but can have the bedplate of a circular surface or a circular arc surface.

As described herein before, in the inventive remote center compliance, three or more polar-type limiters are arranged on either of the upper and lower structures, and at least one limiter exists in each of both sides as to a straight line passing through the central axis on a plane vertical to the central axis, and when a predetermined elastic displacement $\delta_s$ occurs in an up and down direction, by supporting the contact surface installed in the end portion of the respective limiters through the bedplate installed on the second structure, the limiting cover support the force-insertion force for the upper and lower structures to maintain a parallelism. In a state securing a function of correcting a location error or angle error between parts by the remote center compliance, even though a relatively strong force-insertion force is applied, the force-insertion work can be performed smoothly without buckling the elastic bodies.

In particular, when a precise part is forcibly inserted on an automated production line, according to a conventional method, a location error or angle error is corrected by a skilled person. However, using the remote center compliance according to the present invention, a non-skilled person can perform a force-insertion work smoothly, whereupon a predictability improvement, a cost reduction, a working reliability improvement, and an inferior goods reduction can be achieved.

Further, in the remote center compliance of the present invention, the cylindrical limiting cover is installed on either of the upper and lower structures, so that when a predetermined elastic displacement $\delta_s$ of a predetermined direction occurs in the elastic bodies, by supporting the contact surface installed on the end portion of the limiting cover through the bedplate installed on the outer circumference portion of the second structure, the predetermined elastic displacement $\delta_s$ of the elastic bodies is restricted, the limiting cover supports the force-insertion force so that the upper and lower structures can maintain a parallelism. In a state securing a function of correcting a location error or angle error between parts by the remote center compliance, even though a relatively strong force-insertion force is applied, the force-insertion work can be performed smoothly. Since the limiting cover protects the elastic bodies from an external heat or oil, a durability and a life span of the remote center compliance can be improved.

By using the upper structure as the first structure, the limiter or the limiting cover is installed on the upper structure, and parts attached to the lower structure is reduced. As a result, a movement by an elastic transformation of the elastic bodies can be lightened by reducing an inertial mass while a life span of the elastic bodies can be increased by reducing a load of the elastic bodies.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A remote center compliance device, comprising:
   upper and lower structures arranged in parallel to face each other;
   a plurality of elastic bodies coupling the upper and lower structures around a central axis of the remote center compliance device; and
   three or more polar-type limiters of the same heights installed on a first structure of one of the upper and lower structures around the central axis to extend toward a second structure of the other, and arranged such that at least one limiter exists in each of both sides as to a straight line passing through the central axis on a plane vertical to the central axis;
   wherein each of the limiters includes a head portion having a wide section area on the end portion thereof and screw portions on the lower portion thereof, a gap (t) is given between a flat contact portion on an upper surface of the limiter and an upper surface of the upper structure, a gap (u) is given between an outer circumference of the head portion and an inside surface of a hole (2b) and the gap (t) is set to be smaller in shear transformation limit than an elastic displacement (δc) of an axis direction and be identical to a predetermined elastic displacement (δc), so that when a predetermined elastic displacement of an up-and-down direction occurs in the elastic bodies, the predetermined elastic displacement of the elastic bodies is restricted by supporting a contact surface installed on an end portion of the respective limiters by a bedplate installed on the second structure.

2. The compliance device of claim 1, wherein a hole receiving the end portion of the limiter is installed in a portion of the second structure corresponding to a portion of the first structure where the limiter is installed, and the bedplate supporting the contact surface is installed in a member fixed to an opposite surface of the hole into which the end portion of the limiter is inserted.

3. The compliance device of claim 2, wherein the upper structure is the first structure.

4. The compliance device of claim 2, wherein the elastic bodies include rubber plates and metal washers which are stacked in turn, and a predetermined elastic displacement is set to be smaller in shear transformation limit of the elastic bodies than an elastic displacement of an axis direction.

5. The compliance device of claim 1, wherein the upper structure is the first structure.

6. The compliance device of claim 5, wherein the elastic bodies include rubber plates and metal washers which are stacked in turn, and a predetermined elastic displacement is set to be smaller in shear transformation limit of the elastic bodies than an elastic displacement of an axis direction.

7. The compliance device of claim 1, wherein the elastic bodies include rubber plates and metal washers which are stacked in turn, and a predetermined elastic displacement is set to be smaller in shear transformation limit of the elastic bodies than an elastic displacement of an axis direction.

8. A remote center compliance device, comprising:
   upper and lower structures arranged in parallel to face each other;
   a plurality of elastic bodies coupling the upper and lower structures around a central axis of the remote center compliance device; and
   a limiting cover installed on a first structure of one of the upper and lower structures to extend toward a second structure of the other,
   wherein a gap (t) is given between a contact portion (11a) on an upper surface of the limiter cover and a bedplate (3c) a gap (u) is given between an outer circumference of the lower structure and an inner circumference of a lower end portion in which a diameter of the limiting cover becomes large and the gap (t) is set to be smaller in shear transformation limit than an elastic displacement ($\delta c$) an axis direction and be identical to a predetermined elastic displacement ($\delta s$) wherein when a predetermined elastic displacement of an up-and-down direction occurs in the elastic bodies, the predetermined elastic displacement of the elastic bodies is restricted by supporting a contact surface installed on an end portion of the respective limiters by a bedplate installed on the second structure.

9. The compliance device of claim 8, wherein the upper structure is the first structure.

10. The compliance device of claim 8, wherein the elastic bodies include rubber plates and metal washers which are stacked in turn, and a predetermined elastic displacement is set to be smaller in shear transformation limit of the elastic bodies than an elastic displacement of an axis direction.

* * * * *